US010873498B2

(12) United States Patent
Satapathy et al.

(10) Patent No.: US 10,873,498 B2
(45) Date of Patent: Dec. 22, 2020

(54) SERVER NETWORK INTERFACE LEVEL FAILOVER

(71) Applicant: HEWLETT PACKARD ENTERPRISE DEVELOPMENT LP, Houston, TX (US)

(72) Inventors: Asutosh Satapathy, Bangalore (IN); Krishna Babu Puttagunta, Roseville, CA (US); Vivek Agarwal, Andover, MA (US); Rupin T. Mohan, Andover, MA (US); Dheeraj Sharma, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 60 days.

(21) Appl. No.: 15/938,933

(22) Filed: Mar. 28, 2018

(65) Prior Publication Data

US 2019/0123956 A1   Apr. 25, 2019

(30) Foreign Application Priority Data

Oct. 23, 2017   (IN) .............................. 201741037316

(51) Int. Cl.
| | |
|---|---|
| H04L 12/24 | (2006.01) |
| H04L 29/14 | (2006.01) |
| H04L 29/08 | (2006.01) |
| G06F 9/455 | (2018.01) |
| H04L 12/715 | (2013.01) |
| G06F 3/06 | (2006.01) |
| H04L 12/931 | (2013.01) |
| G06F 11/00 | (2006.01) |
| H04L 29/12 | (2006.01) |

(52) U.S. Cl.
CPC ............ *H04L 41/0663* (2013.01); *G06F 3/06* (2013.01); *G06F 9/45558* (2013.01); *G06F 11/00* (2013.01); *H04L 45/64* (2013.01); *H04L 49/00* (2013.01); *H04L 61/15* (2013.01); *H04L 67/1097* (2013.01); *H04L 69/40* (2013.01); *G06F 2009/45595* (2013.01); *H04L 61/6045* (2013.01)

(58) Field of Classification Search
CPC ........ H04L 41/0663; G06F 3/06; G06F 11/00; G06F 9/45558
See application file for complete search history.

(56) References Cited

U.S. PATENT DOCUMENTS

| | | | |
|---|---|---|---|
| 7,366,784 B2 | 4/2008 | Ishizaki | |
| 8,001,269 B1 * | 8/2011 | Satapati | ............ H04L 29/12028 709/245 |

(Continued)

OTHER PUBLICATIONS cloudibee.com, "Linux Network Bonding—Setup Guide," (Web Page), Jul. 17, 2015, 6 pages, http://www.cloudibee.com/network-bonding-modes/.

(Continued)

*Primary Examiner* — Parth Patel
(74) *Attorney, Agent, or Firm* — Trop, Primer & Hu, P.C.

(57) ABSTRACT

A technique includes hosting an Internet Storage Name Service (iSNS) server on a network switch to provide access to a plurality of subnets; and configuring the iSNS server to be an active server for a first subnet of a plurality of subnets and to be a backup server for a second subnet of the plurality of subnets.

18 Claims, 5 Drawing Sheets

(56) References Cited

U.S. PATENT DOCUMENTS

| | | | |
|---|---|---|---|
| 8,209,405 B1 | 6/2012 | Trivedi | |
| 8,824,299 B1* | 9/2014 | Caputo, II | H04L 45/22 370/235 |
| 8,949,389 B1* | 2/2015 | Rimmer | H04L 41/0866 370/230 |
| 10,389,634 B2* | 8/2019 | Thakkar | H04L 45/44 |
| 10,404,590 B2* | 9/2019 | Bogdański et al. | H04L 61/10 |
| 10,447,579 B2* | 10/2019 | Gundavelli | H04W 76/12 |
| 2002/0067731 A1* | 6/2002 | Houston | H04L 12/4633 370/401 |
| 2004/0268175 A1* | 12/2004 | Koch | H04L 67/1034 714/4.11 |
| 2005/0111494 A1* | 5/2005 | Kecskemeti | H04L 29/12009 370/521 |
| 2005/0138466 A1* | 6/2005 | Spry | G06F 11/2007 714/4.1 |
| 2006/0085522 A1* | 4/2006 | Spry | H04L 61/2015 709/220 |
| 2006/0095597 A1* | 5/2006 | Bai | G06F 13/4004 710/8 |
| 2006/0268834 A1* | 11/2006 | Bajic | H04L 29/12009 370/352 |
| 2006/0280179 A1* | 12/2006 | Meier | H04L 29/12235 370/389 |
| 2007/0104202 A1* | 5/2007 | Tariq | H04L 63/0435 370/392 |
| 2008/0025208 A1* | 1/2008 | Chan | H04L 12/42 370/217 |
| 2008/0215910 A1 | 9/2008 | Gabriel et al. | |
| 2009/0024761 A1* | 1/2009 | Li | H04L 29/1216 709/244 |
| 2009/0164630 A1* | 6/2009 | Hirata | H04L 63/0209 709/225 |
| 2009/0304000 A1* | 12/2009 | Masputra | H04L 45/00 370/392 |
| 2010/0142368 A1* | 6/2010 | Gunukula | H04J 3/14 370/217 |
| 2013/0166737 A1* | 6/2013 | Christenson | H04L 69/40 709/224 |
| 2014/0328300 A1* | 11/2014 | Luo | H04W 8/08 370/329 |
| 2015/0312144 A1* | 10/2015 | Gobriel | H04L 45/7453 709/242 |
| 2015/0334696 A1* | 11/2015 | Gu | H04L 67/1095 718/1 |
| 2016/0308764 A1* | 10/2016 | Le | H04L 45/742 |
| 2017/0034053 A1* | 2/2017 | Chanda | H04L 45/586 |
| 2017/0317974 A1* | 11/2017 | Masurekar | H04L 69/22 |
| 2017/0364425 A1* | 12/2017 | Haid | G06F 9/45558 |
| 2018/0124220 A1* | 5/2018 | Puttagunta | H04L 69/40 |
| 2019/0081862 A1* | 3/2019 | Lockhart | H04L 41/084 |
| 2019/0123956 A1* | 4/2019 | Satapathy | H04L 41/0663 |

OTHER PUBLICATIONS ibm.com, "Example iSCSI Configurations," (Web Page), Nov. 11, 2009, 4 pages, https://www.ibm.com/support/knowledgecenter/en/ST3FR7_6.4.1/com.ibm.storwize.v7000.641.doc/svc_example_iscsi_san_configurations_08301830.html.

Jithin, "What is Network Bonding? Types of Network Bonding," Nov. 29, 2016, interserver.net, <https://www.interserver.net/tips/kb/network-bonding-types-network-bonding/>.

osisoft.com, "3239OS18—OPC Interface-level failover without MS clustering: Information and Tips," Jul. 3, 2006, 4 pages, https://techsupport.osisoft.com/Troubleshooting/KB/3239OS18.

Quigley, B., "UbuntuBonding," (Web Page), Sep. 15, 2015, 6 pages, https://help.ubuntu.com/community/UbuntuBonding.

Tseng et al., "Internet Storage Name Service (iSNS)," Network Working Group, Request for Comments: 4171, Sep. 2005, pp. 1-123.

Wikipedia, "Virtual Lan," Oct. 16, 2017, <https://en.wikipedia.org/w/index.php?title=Virtual_LAN&oldid=805584440>, pp. 1-8.

* cited by examiner

SERVER NETWORK INTERFACE LEVEL FAILOVER

BACKGROUND

The Internet Storage Name Service (iSNS) protocol allows automated discovery, management and configuration of iSCSI and Fibre Channel devices (using iFCP gateways) on a Transmission Control Protocol/Internet Protocol (TCP/IP) network. In this manner, initiator and target storage nodes may register with an iSNS server. An initiator storage node may query the iSNS server to identify target storage nodes, including querying the initiator node to identify recently added target storage nodes and determining which target storage nodes may no longer be available.

DETAILED DESCRIPTION

Figure 1:
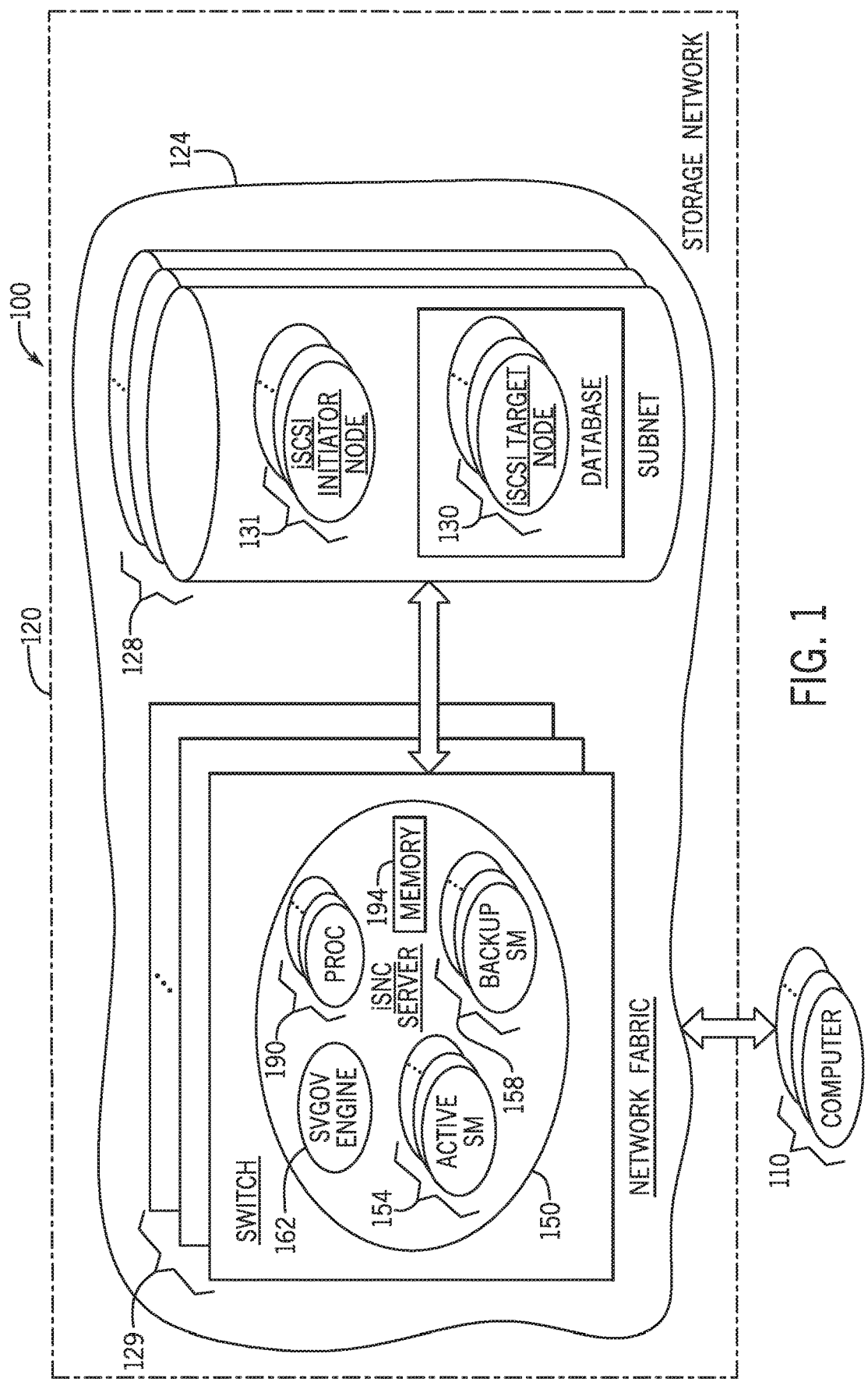
FIG. 1 is a schematic diagram of a computer system according to an example implementation.

A group of iSNS servers may form a server cluster and handle different transaction processing functions pursuant to a defined policy. In this context, a server, such as an iSNS server, refers to a physical server or a virtual server. In this manner, the server may correspond to a physical machine (the server may be hosted by a network switch, for example), and as such, the server may have dedicated hardware and software resources. When the server is a virtual machine, the server may be one of several virtual machine-based servers that reside on a single physical machine; and each virtual machine-based server may have its own virtualized operating system (OS) and other virtualized resources that are isolated from the other virtual machine-based servers. The server may also be a virtualized container-based server, in which the server may, for example, share an operating system kernel with other container-based servers on a single physical machine. Thus, the iSNS server may be a physical, actual server or a virtual server; and a cluster of iSNS servers may be a group of physical servers; a virtualized group of servers on a single physical machine; a virtualized group of servers on multiple physical machines; and so forth.

Regardless of its particular form, the iSNS server may have one or multiple network interfaces. In this context, a network interface provides an endpoint for the server for communicating over a network. As an example, a given network interface of the iSNS server may be formed from a single physical port of a physical network switch that hosts the server or may be formed from multiple, aggregated physical ports of the switch. As other examples, a given network interface of the iSNS server may be formed from one or multiple virtual ports. The "network interface" could also be referred to as a "port interface" or an "endpoint interface" of the iSNS server.

For purposes of providing high availability (HA), an iSNS server cluster may provide a "failover" operational mode. In this context, a first server failing over to a second server refers to the second server taking over operations for the first server in response to the first server failing, or otherwise being incapable of performing its functions. For this example, before the failover, the first server may be labeled the "active server," and the second server may be labeled the "backup server." After the failover, the second server becomes the active server, and if the first server recovers from its failure, the first server may become a backup server for the second server.

One of several error conditions may trigger a failover for an iSNS server, such, as examples, the failure of a physical network switch that is hosting the iSNS server; all physical cables being disconnected from the switch; an operating system of the switch crashing; the iSNS server crashing due to a software issue; or all network interfaces of the iSNS server going down at the same time for an unknown reason.

The iSNS servers of a given cluster may serve a single subnet. In this context, a subnet refers to a defined part of a network and may be defined by, for example, a network identity address and a subnet prefix. One iSNS server of the cluster may be the "active server," or the iSNS server of the cluster. As the active server, the iSNS server may communicate with iSNS target nodes and iSNS initiator nodes for such purposes as responding to SNS protocol queries and requests made by iSNS clients; initiating state change notifications when the storage fabric changes; and so forth. In this manner, the iSNS server receives packets from and transmits packets to the subnet on behalf of the cluster. The other iSNS servers of the cluster function as backup servers, so that is the active iSNS, if unable to serve the subnet (due to one of the foregoing listed error conditions, for example), the active iSNS server may fail over to one of these backup servers. In this manner, one of the backup iSNS servers may be elected by the cluster to be the active server for the subnet in a manner that ensures continuous seamless service for all iSNS clients of the server cluster.

In accordance with example implementations that are described herein, a single iSNS server may serve multiple subnets. For example, an iSNS server may have multiple network interfaces, and through each of these network interfaces, the iSNS server may serve a different subnet. Moreover, the iSNS server may be part of a cluster of iSNS servers, where each iSNS server of the cluster may serve multiple subnets. For this arrangement, failover may be triggered by a given network interface of an iSNS server going down, or becoming unavailable (a port of an aggregation of ports of the hosting network switch failing, for example).

One way to handle failover at the network interface level is to use a complete iSNS server failover mechanism, so that an iSNS server of the cluster, which experiences a failed network interface is completely taken down; and one of the remaining iSNS servers of the cluster is elected to take over as the active server to serve the multiple subnets served by the down iSNS server. However, this approach involves taking down an entire iSNS server, even though all network interfaces but the failed network interface may be working fine without any errors.

In accordance with example implementations, a server, such as an iSNS server, may be constructed to perform a network interface level failover, so that the network interface, and not the entire iSNS server, fails over. In this manner, in accordance with example implementations, an iSNS server may have multiple network interfaces. Each network interface, in turn, may be associated with a different subnet, so that the iSNS server may use each of the network interfaces to server a different subnet. In other words, the iSNS server may be configured to be an active server for each of the subnets, each active server may be associated with one of the network interfaces, and each active server may serve its subnet through its associated network interface. Should a particular network interface of the server fail, the iSNS server performs a network interface level failover.

In this context, a "network interface level failover" refers to the iSNS server transferring operations handled through a first network interface of the iSNS server (here, the "failed network interface") to a second network interface of the iSNS server. In accordance with example implementations, the network interfaces are associated with different subnets; and the network interface level failover refers to the iSNS server using the second network interface to actively serve a subnet that was previously actively served by the iSNS server using the first network interface.

More specifically, in accordance with example implementations, the iSNS server may associate its network interfaces with different subnets, and the iSNS server may use each network interface to actively serve an associated subnet. In addition to associating a given network interface with actively serving an associated subnet, the iSNS server may also associate the given network interface with being a backup for another subnet.

In accordance with some implementations, an iSNS server may be an active server for a first subnet, and at the same time, the iSNS server may be a backup server for a different, second subnet. In this manner, in accordance with example implementations, the iSNS server may initially be configured to be an active server for subnets that served though network interfaces of the iSNS server. In other words, each network interface may be associated with the iSNS server actively serving the subnet that is associated with the network interface. As such, packets for subnet A, for example, are transmitted and received through network interface A that is associated with subnet A. For purposes of providing network level failover, the iSNS server may also be initially configured so that a given network interface is associated with another subnet in a backup role. For example, the iSNS server may be configured so network interface B may be used as a backup network interface for subnet A should network interface A fail.

In general, when a network interface of the iSNS server is assigned to actively serve a particular subnet (through user configuration of the iSNS server, for example, as described herein), the combination of the iSNS server and the iSNS server's use of the network interface to actively serve the subnet forms an active server. In a similar manner, when a network interface of the iSNS server is assigned to back up a particular subnet (through user configuration of the iSNS server, for example, as described herein), the combination of the iSNS server and the iSNS server's use of the network interface as a backup forms a backup server.

An active server and a backup server perform different roles. An active server sends out heartbeat packets to inform the backup server(s) that the active server is still available (and thus, has not gone down or failed). The backup server does not send out packets, but rather, the backup server monitors for heartbeat packets from its corresponding active server so that should the heartbeat packets cease, the backup server may initiate fail over to take over the operations of the active server.

The data packets that are received by the iSNS server and transmitted from the iSNS server, may, in accordance with example implementations, be segregated so that the packets associated with a given subnet are routed to the appropriate active server. As described herein, the iSNS server creates iSNS server instances for its network interfaces, with each iSNS server instance being the active server for an associated network interface. In other words, the packets are segregated so that the iSNS server may match up a given packet that is associated with a given subnet with the iSNS instance that actively serves the given subnet. This segregation is achieved, in accordance with example implementations, by the iSNS server tagging each packet (e.g., inserting an identifier into the header of the packet) with a subnet identifier that uniquely identifies the packet with a particular subnet. Moreover, in accordance with example implementations, storage database schema may allow database segregation of the packets based on a subnet identifier column of the database.

As a more specific example, FIG. 1 depicts a storage network 100 in accordance with some implementations. In general, the storage network 100 may be an internet Small Computer System Interface (iSCSI) storage network, which includes network fabric 124 (Transmission Control Protocol/Internet Protocol (TCP/IP) fabric, for example), iSCSI target nodes 130 (forming an associated database 134) and iSCSI initiator nodes 131. The iSCSI target nodes 130 and iSCSI initiator nodes 131 may be contained in various network partitions, or subnets 128. In this context, a "subnet" refers to a part, or partition, of the network address space such that a given subnet 128 may be associated with, for example, a network identification (ID) and a corresponding subnet prefix.

The network fabric 124 may contain physical gateways, routers, switches 129 and other components. In particular, in accordance with example implementations, a physical network switch 129 may host one or multiple iSNS servers 150. In accordance with example implementations, a given iSNS server 150 may serve multiple subnets 128. In this manner, as described further herein, a set of network interfaces of the iSNS server 150 may initially be associated with different subnets 128, so that the iSNS server 150 uses each of the network interfaces to actively serve a different associated subnet 128.

Additionally, in accordance with example implementations, one or multiple of these network interfaces may be initially associated as being used for backups for the subnets 128. In this manner, the iSNS server 150 may be configured to use a first network interface to actively serve a first subnet 128, and the iSNS server 150 may also be configured to use the first network interface as a backup for a second subnet 128 so that should a second network interface that actively serves the second subnet 128 fail, the second network interface may failover to the first network interface.

As depicted in FIG. 1, one or multiple computers 110 may communicate data to and from the storage network 120 for purposes of storing data in the database 134 and retrieving data from the database 134. Moreover, one or multiple computers 110 may form, for example, a file system; and one or multiple computers 110 may be used by a user, as described herein, for purposes of configuring a particular physical iSNS server 150 to serve multiple associated subnets and to establish backup and active servers for these subnets, as further described herein.

As depicted in FIG. 1, in accordance with some implementations, a given physical iSNS server 150 may include one or multiple processors 190 (one or multiple central processing units (CPUs), one or multiple CPU processing cores, and so forth) and a memory 194. The memory 194, in general, may store data pertaining to the preliminary, intermediate and final results of various processing operations that are described herein, as well as store machine executable instructions (or "software"), which may be executed by one or multiple processors 190 for purposes of providing active and backup servers for different subnets of the physical iSNS server 150, managing failover, segregating data according to the associated subnets, assigning IDs to packets to identify packets with certain subnets, as further described herein, and so forth.

More specifically, in accordance with example implementations that are described herein, the instructions that are stored in the memory 194 may, when executed by one or multiple processors 190, cause the processor(s) 190 to form software instances of the iSNS server 150 that are associated with active and backup servers for the subnets 128; backup 158 and active 154 state machines to control the states of the active and backup servers; and a Smart VLAN Generator OR Validator (SVGOV) engine 162.

In accordance with example implementations, the SVGOV engine 162 generates an identifier called a Smart VLAN ID (SVID) when a user (a user via a management computer 110, for example) configure the iSNS server 150 to serve a new subnet; and the SVID is included in any packets associated with the subnet, whether communicated to or from the iSNS server 150. The iSNS server 150 uses the SVID to associate packets with corresponding subnets 128 and the particular network interface that is currently being used to actively serve that subnet 128.

In general, the memory 194 is a non-transitory storage medium that is formed from storage devices, such as semiconductor storage devices, memristors, phase change memory devices, volatile memory devices, non-volatile memory devices, memory devices from other storage technologies, one or more of the foregoing storage devices, and so forth.

In general, the iSNS server 150 may be an actual, physical machine (e.g., part of the switch 129 having an associated, dedicated set of actual hardware and software); or the iSNS server may be a virtual server. For example, the iSNS server 150 may be a guest virtual machine of the switch 129, and the switch 129 may include a virtual machine monitor, or hypervisor, and other guest virtual machines that correspond to one or multiple additional virtual machine-based iSNS servers. The virtual machine-based iSNS server may, for example, have an associated set of abstracted physical hardware and its own abstract version of an operating system (OS) As another example, the iSNS server may be virtualized via a container that may share an operating system kernel among one or multiple other such container-based iSNS servers.

Figure 2:
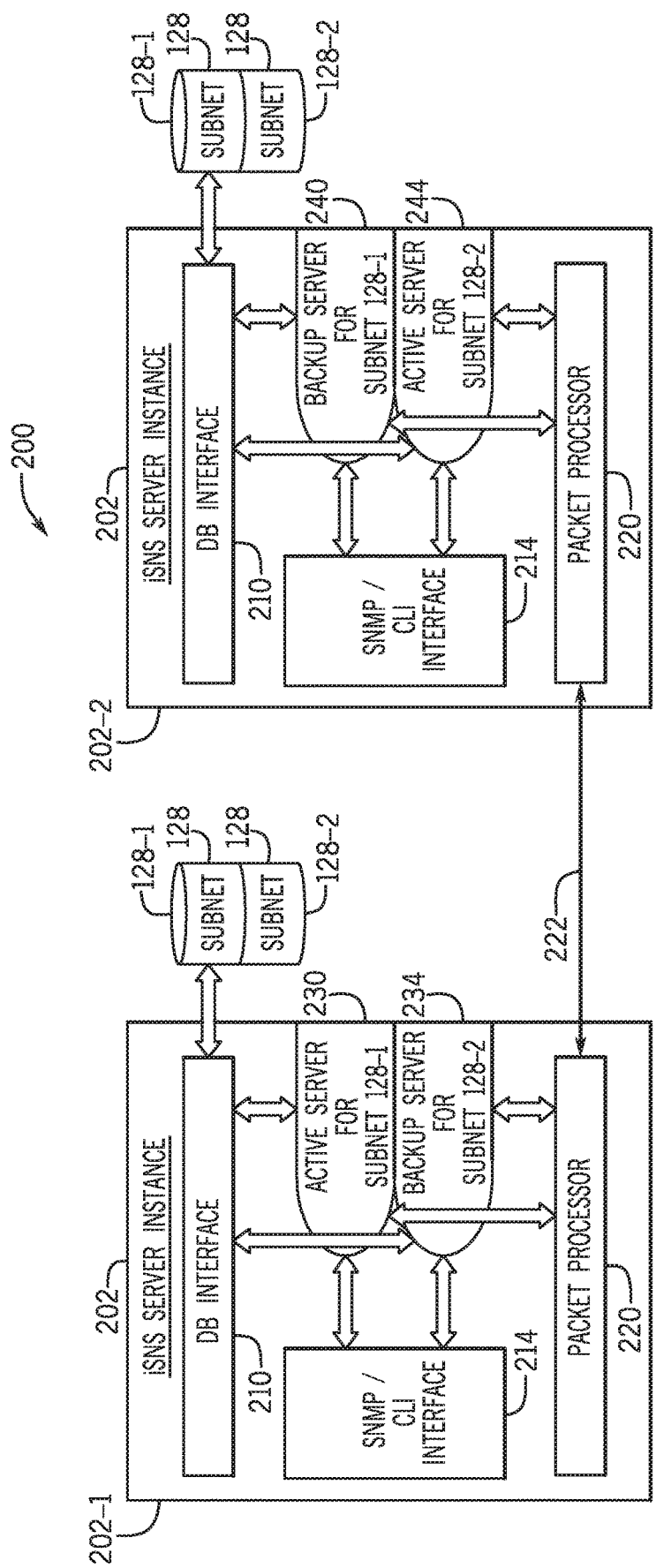
FIG. 2 is an illustration of iSNS server instances formed on an iSNS server to allow iSNS network interface level failover according to an example implementation.

Referring to FIG. 2 in conjunction with FIG. 1, in accordance with example implementations, the iSNS server 150 creates multiple iSNS server instances 202 (two example iSNS server instances 202-1 and 202-2 being depicted in FIG. 1), and associates each iSNS server instance 202 with a particular network interface of the iSNS server 150. In this context, an "instance" refers to the software realization of an object, where the object here is an abstraction of the iSNS server 150.

In accordance with example implementations, the iSNS server 150 configures the iSNS server instance 202 to be an active server for one of the subnets 128. In this manner, in accordance with example implementations, the iSNS server 150 may be configured via a user (a user by way of a management computer 110 (FIG. 1), for example) to actively serve a given subnet 128; and in response to this configuration, the iSNS server 150 may start an iSNS server instance 202 to serve the given subnet. In this manner, a user may configure the iSNS server 150 to serve different subnets 128, and the iSNS server 150 may correspondingly start iSNS instances 202 to actively serve these subnets 128, at least initially (before any failover occurs), through different associated network interfaces of the iSNS server 150, so that multiple iSNS server instances 202 do not actively serve the same subnet 128. Due to this constraint, the iSNS server 150 may use the SVID of a given packet (associating the packet with a particular subnet 128) to identify an iSNS server instance 202 that is the active server for the packet. Accordingly, the iSNS server 150 may direct the given packet to the iSNS server instance 202 that is associated with the SVID so that the instance 202 may process the packet.

For the example implementation that is depicted in FIG. 2, the iSNS server instances 201-1 and 202-2 are each associated with a different network interface of the iSNS server 150; and the iSNS server instances 201-1 and 202-2 are configured to be active serves for the subnets 128-1 and 128-2, respectively, through these network interfaces. The server state for a given iSNS server instance 202, i.e., the state controlling whether the server instance 202 serves as a backup server or an active server, may be controlled by the active 154 and backup 158 state machines (FIG. 1) of the iSNS server 150.

For the example implementation of FIG. 2, the iSNS server instance 202-1 has a state 230, which reflects the iSNS server instance 202-1 as being the active server for the subnet 128-1 and a state 234, which reflects the iSNS server instance 202-1 as being the backup server for the subnet 128-2. The roles reverse for the iSNS server instance 202-2: the iSNS server instance 202-1 has an associated state 240 reflecting the iSNS instance 202-2 as being a backup for the subnet 128-1 and a state 244 reflecting the iSNS server instance 210-2 being the active server for the subnet 128-2.

As also illustrated in FIG. 2, in accordance with example implementations, the iSNS server instance 202 may include a network interface 214 that allows the instance 202 to communicate with a management server, such as one of the computers 110 of FIG. 1, to set up or configure the network interfaces pertaining to their active and backup assignments using a Simple Network Management Protocol (SNMP) and/or a Command Line Interface (CLI) protocol.

Moreover, the iSNS server instance 202 may include a packet processor 220 to process packets actively served by the instance 202 as well as a failover communication link 222. The failover communication link 222 allows the iSNS instance 202 to, in its role as being an active server for a given network interface, send heartbeat packets to the iSNS server instance(s) 202 that serves as the backup(s); and the failover communication link 222 allows the iSNS server instance 202 to, in its role of being a backup server for a given network interface, monitor for heartbeat packets from the currently active iSNS server instance 202.

The iSNS server 150 may failover at the network interface level or may failover completely to another iSNS server, depending on the particular failover error condition that arises. For example, in accordance with some implementations, the iSNS server 150 may failover completely to another iSNS server when one or multiple of the following occur: the network switch 129 (FIG. 1) that hosts the iSNS server 150 fails; all physical cables are disconnected from the switch 129; an operating system of the switch 129 crashes; the iSNS server 150 crashes in its entirety due to a software issue; or all network interfaces of the iSNS 150 server go down, or become unavailable, at the same time. Moreover, in accordance with example implementations, should a particular network interface of the iSNS server 150 fail, the iSNS server 150 may failover at the network interface level, i.e., one iSNS server instance 202 may take over as the active server for another instance 202 for purposes of serving a particular subnet 128.

Figure 3:
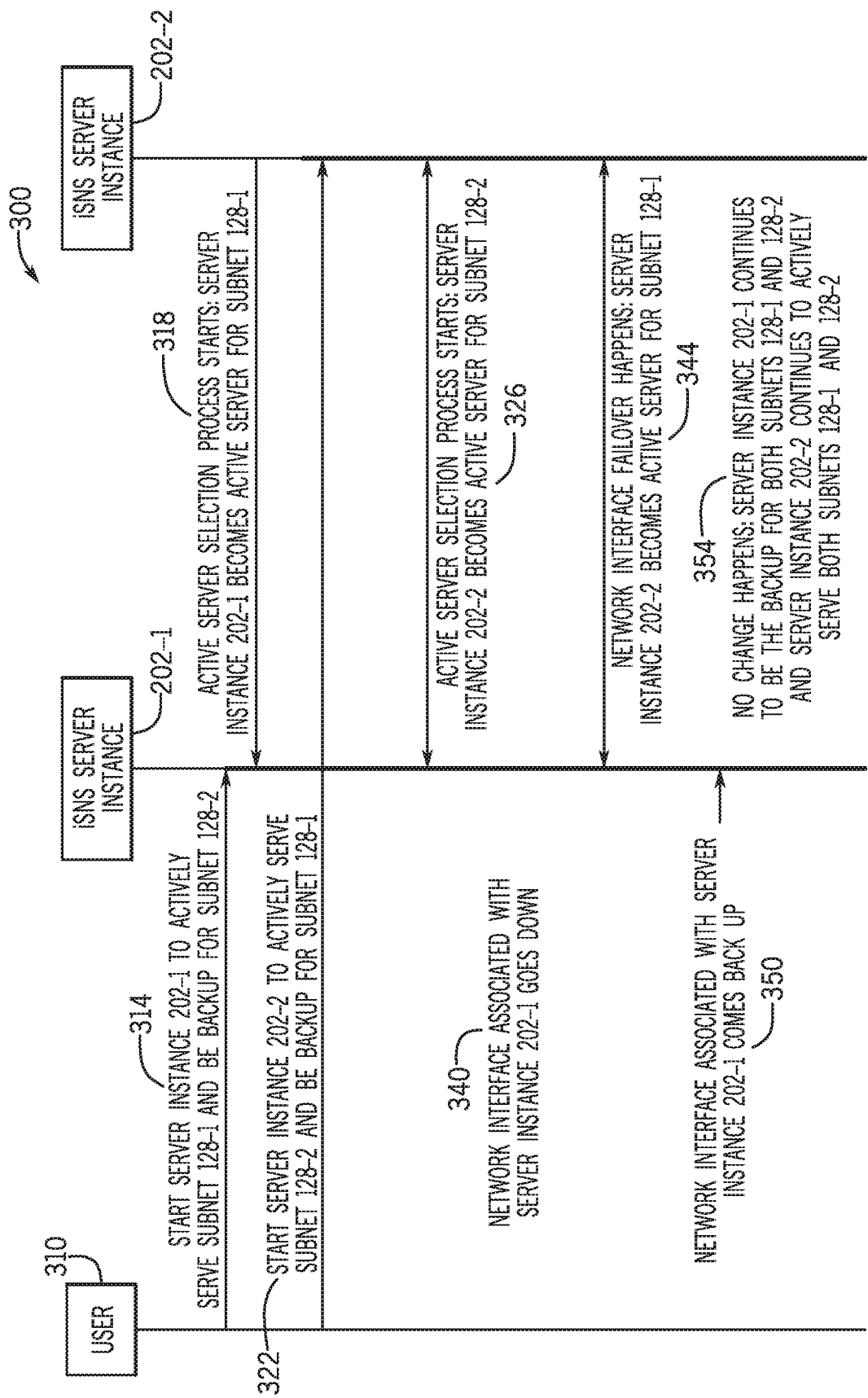
FIG. 3 is a sequence flow diagram illustrating iSNS network interface level failover according to an example implementation.

FIG. 3 depicts a sequence flow diagram 300 illustrating an example sequence for establishing the server instances 202-1 and 202-2 (FIG. 2) and failing over at the network interface level. More specifically, a user 310 may communicate with the physical iSNS server 150 to start (as indicated at reference numerals 314 and 318) the server instance 202-1 so that the server instance 202-1 actively serves the subnet 128-1. In a similar manner, the user 310 may start (as indicated at reference numerals 322) the server instance 202-2 by configuring the server instance 202-2 to be the active server for the subnet 128-2 and backup for the subnet 128-2.

As depicted at reference numeral 340 of FIG. 3, the network interface that is associated with the server instance 202-1 may become unavailable, or go down, and this triggers an active server interface selection process. In this regard, as indicated at reference numeral 344, as a result of this process, the iSNS server 150 selects the server instance 202-2 as the new active server for the subnet 128-1. As also depicted in FIG. 3, although the network interface that is associated with the server instance 202-1 may come back up (as indicated at reference numeral 340), no change happens. In other words, the server instance 202-1 continues to be the backup server for both the subnets 128-1 and 128-2; and the server instance 202-2 continues to be the active server for both the subnets 128-1 and 128-2.

Referring back to FIG. 1, in accordance with example implementations, when the iSNS server 150 is configured (via a user, for example) for multiple subnets at the starting point or afterwards, the server 150 maintains a subnet list(s) of entries, where each entry contains information such as the subnet prefix, the SVID and which server instance serves as the active or backup server. In this manner, in accordance with example implementations, the SVGOV engine 162 may use the subnet prefix and sum of positional value of each of the set bits of the network ID of the subnet to generate a unique SVID number. In accordance with example implementations, the SVGOV engine 162 may return an error if an attempt is made (via a user, for example) to configure the same subnet again with a different IP.

As a more specific example, in accordance with some implementations, the SVGOV engine 162 may generate a unique SVID for the subnet by shifting left each octet to generate its positional value, bitwise ORing the output (i.e., the shifted octets), and then converting the final output to a decimal number, which is the unique SVID.

For example, if two subnets have network IDs (having subnet prefixes of "24") of 10.10.2.1/24 and 10.2.160.1/24, then the SVGOV engine 162 may calculate the SVIDs as follows:

SVID=Convert_to_Decimal{
  (octet1<<24|octet2<<16|octet3<<8)}, where "octet1" represents bits 25 to 32 of the network ID; "octet2" represents bits 17 to 24 of the network ID; "octet3" represents bits 9 to 16 of the network ID"; "<<" represents the bitwise left shift operator (i.e., "octet "1<<24" represents a bitwise left shift by 24 bits); and "|" represents the logical OR operator.

Using the above example of two IP addresses 10.10.2.1/24 and 10.2.160.1/24, the SGOV engine 162 may generate corresponding SVIDs as follows:
SVID1=168428032, for subnet (10.10.2), and
SVID2=167944192, for subnet (10.2.160)

If, for example, an attempt is made to subsequently generate an SVID for the network ID of 10.10.2.4/24 after the SGOV engine 162 generates the SVID1 above, then the SGOV engine 162 does not allow this as a valid subnet for the iSNS server 150, as the network ID of 10.10.2.4/24 results in the same SVID of 168428032. In other words, the SVGOV engine 162 does not allow will 10.10.2.4/24 as a valid subnet for the iSNS server 150 because the same server 150 is already running in that subnet.

In accordance with example implementations, the SVGOV engine 162 associates a given SVID to the active backup server instances 202 using subnet lists (SLs). Each subnet list SL is associated with a particular server instance 202 (and network interface) and identifies the subnet that is actively served by the server instance 202 and the subnet(s) for which the server instance 202 is a backup. Depending on the traditional active server election process, the SVGOV engine 162 may either make the SVID an active or backup entry in a particular SL. Afterwards, when a packet is sent or received, the iSNS server 150 may determine whether the packet is associated with an active or backup subnet and is marked by the iSNS server 150 as being active or backup.

As an example, assume that there are two subnets a.b.c.d/S1 and e.f.g.h/S2, which correspond to the SVIDs, SV1 and SV2, respectively. Then the subnet lists for two instances S1 and S2 for this example are SL [(S1, SV1, Active), (S2, SV2, Backup)] for server S1 and SL [(S1, SV1, Backup), (S2, SV2, Active)] for server S2.

In accordance with example implementations, when the iSNS server 150 starts up with multiple active network interfaces, the iSNS server 150 looks at the SL subnet lists, starts sending heartbeats for all active subnets 128, and also allows receiving packets from all subnets 128. The iSNS server 150, with the help of the SVGOV engine 162, applies each available subnet from the SL subnet list starting from the lowest prefix in an ascending order to check whether the SVID of an incoming packet is for an active or backup subnet. The SVGOV engine 162 may decide whether receiving of such type of packet is valid as per the functionality of either active or backup server. If invalid the packet may be dropped. Otherwise further processing of the packet is allowed. Hence the set of functionalities of an active backup server helps to decide how to process a packet received from a particular subnet. Similarly which type of packet can be sent for which subnet will be decided on the basis of which subnet the packet belongs to and which role the subnet plays (active or backup) at that time.

In accordance with example implementations, when data related to any transaction in between server and initiator/target gets stored in database, the SVID is added as a parameter to the data. This also applies to data related to configurational changes, as the data is tagged with a particular SVID before getting pushed to database. In accordance with example implementations, the schema of the database 134 includes a new field to store the SVID. Hence all database queries may use the SVID to retrieve or store any data. This way separate databases are not used for different subnets. Rather the same database may be accessed separately on the basis of SVID.

Figure 4:
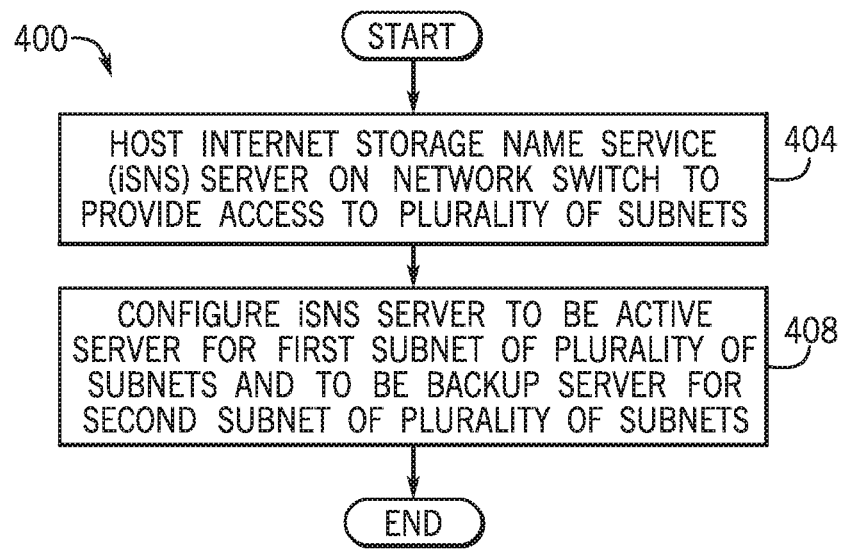
FIG. 4 is a flow diagram depicting a technique to provide iSNS network interface level failover according to an example implementation.
Figure 5:
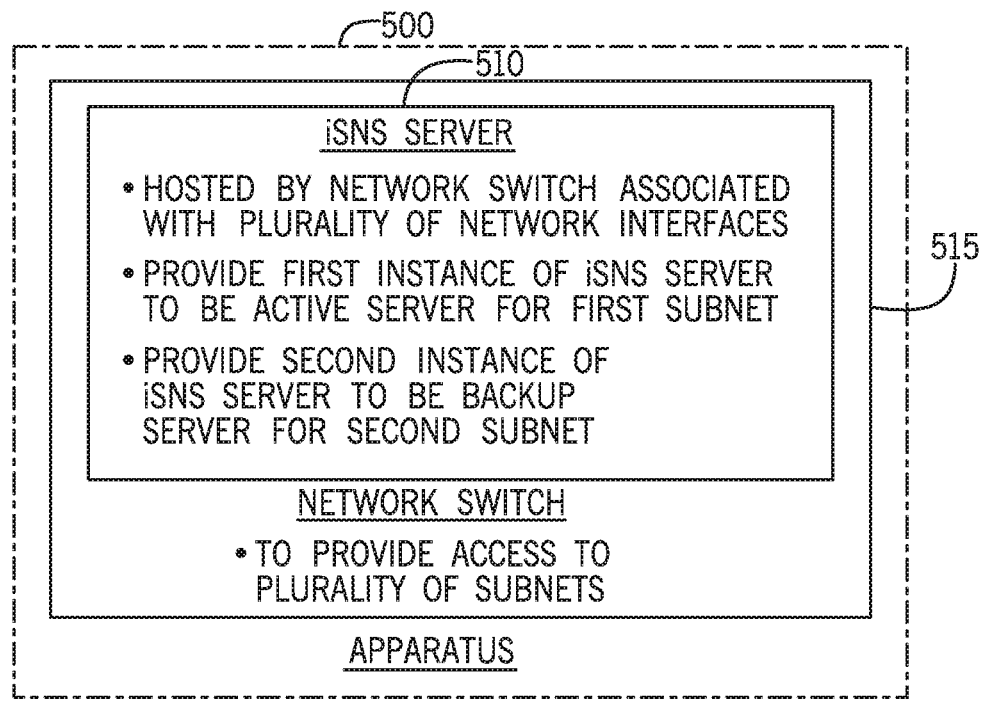
FIG. 5 is a schematic diagram of an apparatus to provide iSNS network interface level failover according to an example implementation.

Thus, in accordance with example implementations, a technique 400 that is depicted in FIG. 4 includes hosting (block 404) an Internet Storage Name Service (iSNS) server on a network switch to provide access to a plurality of subnets. The technique 400 includes configuring (block 408) the iSNS server to be an active server for a first subnet of the plurality of subnets and to be a backup server for a second subnet of the plurality of subnets. Referring to FIG. 5, in accordance with example implementations, an apparatus 500 includes a network switch 515 to provide access to a plurality of subnets. The apparatus 500 includes an internet storage name service (iSNS) server 510 that is hosted by the network switch. The iSNS server 510 is associated with a plurality of network interfaces. The iSNS server 510 provides a first instance of the iSNS server to be an active server for a first subnet of the plurality of subnets and provides a second instance of the iSNS server to be a backup server for a second subnet of the plurality of subnets.

Figure 6:
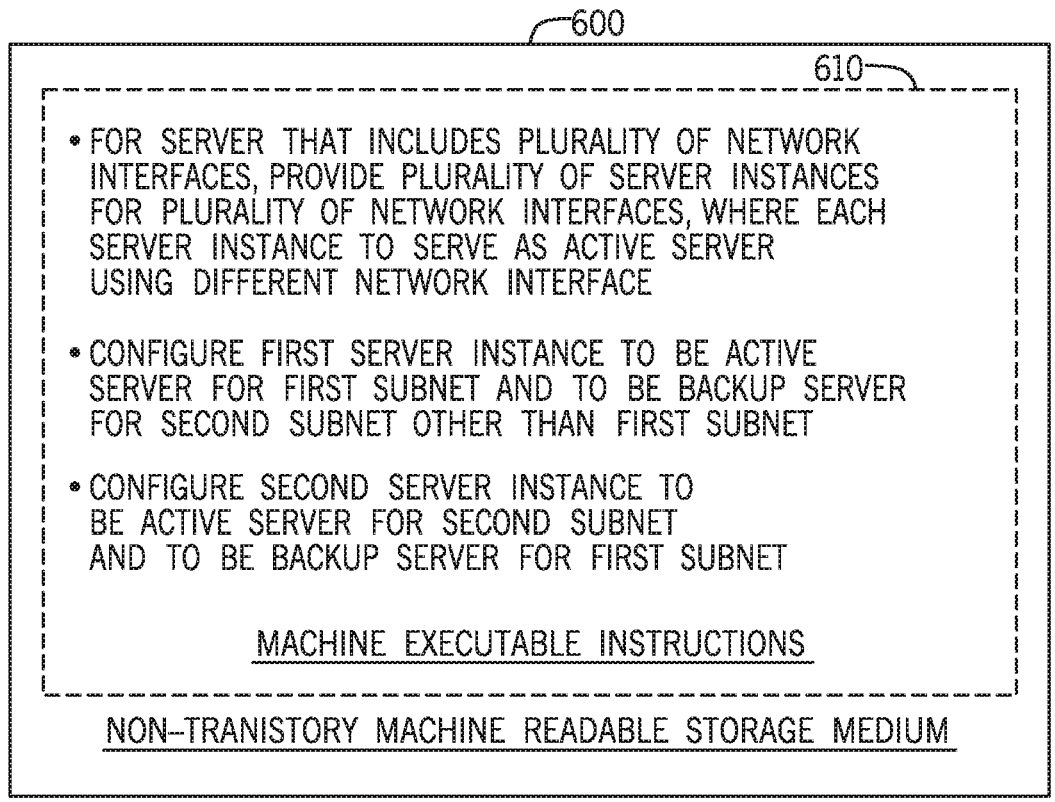
FIG. 6 is an illustration of machine executable instructions to provide iSNS network interface level failover according to an example implementation.

Referring to FIG. 6, in accordance with example implementations, a non-transitory machine readable storage medium 600 may store instructions 610 that, when executed by a machine (e.g., a machine, such as, for example, the network switch 129 (FIG. 1), and/or at least one processor of the switch 129, for example), cause the machine to provide a plurality of server instances for a plurality of network interfaces. For example, the server instances may be ISNS server instances 202 (FIG. 2) of an iSNS server, such as iSNS server 150 (FIG. 1); and the plurality of network interfaces may, for example, plurality of network interfaces of the iSNS server 150. Each server instance of the plurality of server instances is to serve as an active server using a different network interface of the plurality of network interfaces. The instructions 610, when executed by the machine, cause the machine to configure a first server instance of the plurality of server instances to be an active server for a first subnet and to be a backup server for a second subnet other than the first subnet; and configure a second server instance of the plurality of server instances to be an active server for the second subnet and to be a backup server for the first subnet. For example, as described above, the iSNS server instance 202-1 (FIG. 2) is an active server for the subnet 128-1 and is a backup server for the subnet 128-2; and the iSNS server instance 202-2 (FIG. 2) is an active server for the subnet 128-2 and is a backup server for the subnet 128-1.

While the present disclosure has been described with respect to a limited number of implementations, those skilled in the art, having the benefit of this disclosure, will appreciate numerous modifications and variations therefrom. It is intended that the appended claims cover all such modifications and variations. All of the features disclosed in this specification (including any accompanying claims, abstract and drawings), and/or all of the elements of any method or process so disclosed, may be combined in any combination, except combinations where at least some of such features and/or elements are mutually exclusive.

We claim:

1. A method comprising:
hosting an Internet Storage Name Service (iSNS) server on a network switch to provide access to a plurality of subnets; and configuring the iSNS server to be an active server for a first subnet of the plurality of subnets and to be a backup server for a second subnet of the plurality of subnets; determining whether a packet received by the iSNS server is associated with the first subnet or the second subnet based on an identifier of the packet; determining whether the iSNS server is a backup server or an active server for the first subnet or the second subnet determined to be associated with the packet; and processing the packet based on the determination of whether the iSNS sewer is the backup server or the active server for the first subnet or the second subnet determined to be associated with the packet.

2. The method of claim 1, wherein configuring the iSNS server comprises configuring the iSNS server to provide a plurality of instances of the iSNS server, the method further comprises: using a first instance of the plurality of instances to be the active server for the first subnet and to be the backup server for the second subnet.

3. The method of claim 2, further comprising: using a second instance of the plurality of instances to be an active server for the second subnet and to be a backup server for the first subnet.

4. The method of claim 3, further comprising: detecting a failover condition associated with the first subnet; and determining, based on the detected failover condition, whether to fail over to the second instance to allow the second instance to be the active server for the first subnet or fad over to another iSNS server to allow the another iSNS server to be an active server for the first subnet.

5. The method of claim 3, further comprising: in response to the first subnet becoming unavailable, disabling the first instance from being the active server for the first subnet and using the second instance to be an active server for the first subnet.

6. The method of claim 1, further comprising: routing a packet to a network interface of the iSNS server based on an identifier of the packet.

7. The method of claim 6, wherein the identifier associates the packet with a subnet of the plurality of subnets.

8. The method of claim 1, further comprising: inserting an a second identifier into a second packet to be transmitted by the iSNS server representing association of the second packet with a subnet of the plurality of subnets.

9. The method of claim 1, further comprising: using the iSNS server to generate identifiers to be inserted into packets communicated with the iSNS server to coordinate storage of data in a database, wherein the database comprises entries segregated according to different subnets of the plurality of subnets based on the identifiers, the identifiers including the identifier of the packet received by the iSNS server.

10. An apparatus comprising: a network switch; and an Internet Storage Name Sendee (iSNS) server hosted by the network switch, wherein the iSNS server is associated with a plurality of network interfaces, the iSNS server provides a first instance of the iSNS server to be an active server for a first subnet of a plurality of subnets and to be a backup server for a second subnet of the plurality of subnets; wherein the iSNS server is to determine whether a packet received by the iSNS server is associated with the first subnet or the second subnet based on an identifier of the packet; wherein the iSNS server is to determine that first instance of the iSNS server is an active server for the packet based on a determination that the first subnet is associated with the packet; wherein the iSNS server is to determine that the second instance of the iSNS server is a backup server for the packet based on the determination that the first subnet is associated with the packet; and wherein the first instance of the iSNS server is to process the packet based on the determination that the first instance of the iSNS server is the active server for the first subnet determined to be associated with the packet.

11. The apparatus of claim 10, wherein the iSNS server provides a second instance of the iSNS server to be a backup server for the first subnet and to be an active server for the second subnet.

12. The apparatus of claim 11, wherein the first instance of the iSNS server fails over to the second instance of the iSNS server in response to the first subnet becoming unavailable.

13. The apparatus of claim 11, wherein the iSNS server: detects a failover error condition associated with the first instance of the iSNS server; and based on the detected failover error condition, the iSNS server selects to fail over from the first instance of the iSNS server to the second instance of the iSNS server or fail over to another iSNS server.

14. The apparatus of claim 11, further comprising: a node to communicate a packet with the iSNS server, wherein the iSNS server routes the packet for processing to one of the first instance or the second instance based on whether the packet is associated with the first subnet or the second subnet.

15. A non-transitory machine readable storage medium to store machine readable instructions that, when executed by a machine, cause the machine to: for a server comprising a plurality of network interfaces, provide a plurality of server instances for the plurality of network interfaces, wherein each server instance of the plurality of server instances to serve as an active server using a different network interface of the plurality of network interfaces; configure a first server instance of the plurality of server instances to be an active server for a first subnet and be a backup server for a second subnet other than the first subnet; and configure a second server instance of the plurality of server instances to be an active server for the second subnet and be a backup server for the first subnet; determine whether a packet received by the sewer is associated with the first subnet or the second subnet based on an identifier of the packet; determine that first instance of the server is an active server for the packet based on a determination that the first subnet is associated with the packet; determine that the second instance of the server is a backup server for the packet based on the determination that the first subnet is associated with the packet; and process the packet with the first instance of the server based on the determination that the first instance of the server is the active server for the first subnet determined to be associated with the packet.

16. The non-transitory machine readable storage medium of claim 15, wherein the instructions, when executed by the machine, further cause the machine to, in response to the first server instance being unable to actively serve the first subnet, cause the first server instance to failover to the second server instance so that the second server instance actively serves the first subnet.

17. The non-transitory machine readable storage medium of claim 15, wherein the instructions, when executed by the machine, further cause the machine to compare the identifier to a subnet list of associations of the identifier to server instances.

18. The non-transitory machine readable storage medium of claim 15, wherein the server comprises an Internet Storage Name Sendee (iSNS) server.

* * * * *